US010169732B2

(12) United States Patent
Grewal et al.

(10) Patent No.: US 10,169,732 B2
(45) Date of Patent: Jan. 1, 2019

(54) GOAL AND PERFORMANCE MANAGEMENT PERFORMABLE AT UNLIMITED TIMES AND PLACES

(71) Applicant: Oracle International Corporation, Redwood Shores, CA (US)

(72) Inventors: Jasbir Grewal, London (GB); Pallavi Pyreddy, San Ramon, CA (US); Praveen Vipranarayanan, Belmont, CA (US); Siu Wan Surlina Yin, London (GB)

(73) Assignee: Oracle International Corporation, Redwood Shores, CA (US)

( * ) Notice: Subject to any disclaimer, the term of this patent is extended or adjusted under 35 U.S.C. 154(b) by 866 days.

(21) Appl. No.: 14/535,261

(22) Filed: Nov. 6, 2014

(65) Prior Publication Data

US 2016/0078390 A1 Mar. 17, 2016

Related U.S. Application Data

(60) Provisional application No. 62/050,677, filed on Sep. 15, 2014.

(51) Int. Cl.
*G06Q 10/06* (2012.01)

(52) U.S. Cl.
CPC .............................. *G06Q 10/06398* (2013.01)

(58) Field of Classification Search
None
See application file for complete search history.

(56) References Cited

U.S. PATENT DOCUMENTS

| | | | |
|---|---|---|---|
| 6,850,893 B2* | 2/2005 | Lipkin | G06F 9/468 434/118 |
| 7,089,583 B2* | 8/2006 | Mehra | G06F 9/4428 726/3 |

(Continued)

FOREIGN PATENT DOCUMENTS

| | | | |
|---|---|---|---|
| CN | 203070351 | 7/2013 | |
| WO | WO-0152054 A2 * | 7/2001 | ............. G06F 9/465 |

(Continued)

OTHER PUBLICATIONS

Dalal, Surjeet, Vijay Athavale, and Keshav Jindal. "Case retrieval optimization of Case-based reasoning through Knowledge-intensive Similarity measures." Int. J. Comput. Appl 34.3 (2011): (Year: 2011).*

(Continued)

*Primary Examiner* — Thomas L Mansfield
*Assistant Examiner* — Derick J Holzmacher
(74) *Attorney, Agent, or Firm* — Kilpatrick Townsend & Stockton LLP

(57) ABSTRACT

A mobile application enables employees to manage their goals and track their performance at any time, and from any place. A mobile device such as a tablet computer or a smart phone can download goal information over the Internet from a remote server. The mobile device can provide user interfaces through which its user can work on the goal. The mobile device can upload the result of the work performed on the mobile device to the remote server. The mobile application also enables an employee to augment his or her goal and performance data using data from third-party systems. The data from the third party systems can be incorporated into the goal and performance data as evidence of the employee progressing toward his goals. For example, such data from a third-party system might include tweets (Continued)

from a Twitter feed, or stock prices from a NASDAQ ticker feed.

19 Claims, 7 Drawing Sheets

(56) References Cited

U.S. PATENT DOCUMENTS

| | | | |
|---|---|---|---|
| 7,827,050 B2 | 11/2010 | Bangel et al. | |
| 8,280,822 B2* | 10/2012 | McKeown | G06Q 10/067 705/1.1 |
| 8,626,567 B2 | 1/2014 | Allemann et al. | |
| 8,960,535 B2* | 2/2015 | Barnes | G06Q 10/087 235/377 |
| 2002/0049603 A1* | 4/2002 | Mehra | G06F 9/4488 726/3 |
| 2002/0077884 A1* | 6/2002 | Sketch | G06Q 10/10 705/12 |
| 2002/0099578 A1* | 7/2002 | Eicher, Jr. | G06Q 10/06 705/7.39 |
| 2003/0229529 A1* | 12/2003 | Mui | G06Q 10/06 705/328 |
| 2004/0088177 A1* | 5/2004 | Travis | G06Q 10/06398 705/7.42 |
| 2004/0172320 A1 | 9/2004 | Spellman et al. | |
| 2004/0260593 A1* | 12/2004 | Abraham-Fuchs | G06Q 10/06316 705/7.26 |
| 2005/0038718 A1* | 2/2005 | Barnes | G06Q 10/087 705/28 |
| 2005/0144022 A1* | 6/2005 | Evans | G06Q 10/06 705/7.42 |
| 2005/0154635 A1* | 7/2005 | Wright | G06Q 10/06 705/7.39 |
| 2007/0202475 A1* | 8/2007 | Habichler | G06Q 10/06 434/219 |
| 2007/0203786 A1* | 8/2007 | Nation | G06Q 10/06375 705/7.42 |
| 2007/0208572 A1* | 9/2007 | Habichler | G06Q 10/063112 705/7.14 |
| 2007/0208575 A1* | 9/2007 | Habichler | G06Q 10/06398 705/7.42 |
| 2008/0027791 A1* | 1/2008 | Cooper | G06Q 10/06 705/7.15 |
| 2008/0126476 A1* | 5/2008 | Nicholas | G06Q 10/10 709/203 |
| 2009/0043621 A1 | 2/2009 | Kershaw | |
| 2010/0169359 A1* | 7/2010 | Barrett | G06F 17/30616 707/769 |
| 2011/0161139 A1* | 6/2011 | Maheshwari | G06Q 10/06 705/7.42 |
| 2012/0036498 A1* | 2/2012 | Akirekadu | G06F 11/3495 717/124 |
| 2012/0089909 A1* | 4/2012 | Block | G06Q 10/06 715/709 |
| 2012/0303421 A1* | 11/2012 | Yokoi | G06Q 10/06398 705/7.42 |
| 2012/0311047 A1* | 12/2012 | Yokoi | G06Q 10/00 709/206 |
| 2013/0067351 A1* | 3/2013 | Yokoi | G06Q 10/107 715/752 |
| 2014/0033085 A1* | 1/2014 | Kopetsky | G06F 3/0481 715/763 |
| 2014/0052681 A1* | 2/2014 | Nitz | H04L 51/02 706/46 |
| 2014/0157171 A1* | 6/2014 | Brust | G06F 17/30554 715/771 |
| 2015/0295877 A1* | 10/2015 | Roman | H04W 4/029 709/203 |

FOREIGN PATENT DOCUMENTS

| | | | | |
|---|---|---|---|---|
| WO | WO-0152502 A2 * | 7/2001 | | H04L 29/06 |
| WO | WO-0163462 A2 * | 8/2001 | | G06Q 10/06 |
| WO | WO-2004010354 A2 * | 1/2004 | | G06Q 10/067 |
| WO | WO-2006017622 A2 * | 2/2006 | | G06Q 30/02 |
| WO | WO-2012047933 A2 * | 4/2012 | | G06Q 10/06 |

OTHER PUBLICATIONS

Recio-García, Juan A.,Pedro A. González-Calero, and Belén Díaz-Agudo. "jcolibri2: A framework for building Case-based reasoning systems." Science of Computer Programming 79 (2014): (Year: 2014).*

Kozierok, Charles M., "TCP Operational Overview and the TCP Finite State Machine (FSM)." TCP/IP Guide. (Sep. 2015). (Year: 2015).*

Williams, Lloyd G., and Connie U. Smith. "PASA SM: a method for the performance assessment of software architectures." Proceedings of the 3rd international workshop on Software and performance. ACM, 2002. (Year: 2002).*

Westover, Jonathan H., Andrew R. Westover, and L. Alan Westover. "Enhancing long-term worker productivity and performance: The connection of key work domains to job satisfaction and organizational commitment." International Journal of Productivity and Performance Management;59.4 (2010): 372-387. (Year: 2010).*

Popova, Viara, and Alexei Sharpanskykh. "A formal framework for modeling and analysis of organizations." Situational Method Engineering: Fundamentals and Experiences. Springer, Boston, MA, 2007. 343-358. (Year: 2007).*

Weber, Ben G., Michael Mateas, and Arnav Jhala. "Case-based goal formulation." Proceedings of the AAAI Workshop on Goal-Driven Autonomy. 2010. (Year: 2010).*

Dalal, Surjeet, Vijay Athavale, and Keshav Jindal. "Case retrieval optimization of Case-based reasoning through Knowledge-intensive Similarity measures." International Journal of Computer Applications 34.3 (2011): 12-18. (Year: 2011).*

"Automated Org Charting from Your iPad", Aquire, Available online at: http://www.aquire.com/software/orgpublisher_executive /FdxbQVIpg20132,bx9877,bx9873,bx9872,bx9871,cb64191,cb64193?photo=901722, 2014, 3 pages.

"Employee Performance Management Software System", Halogen Software, Inc., Available online at: http://www.halogensoftware.com/, Apr. 2014, 9 pages.

"Getting started with Work.com on Salesforce", salesforcework.com, Available online at: http://work.com/success/resources /Workcom _ Quick_Start_Admin_Guide.pdf, Feb. 2014, 17 pages.

"Goals & Performance", NAKISA, Available online at:http://www.nakisa.com/solutions/solutions-overviews/goals-and-performance-management.htm, Apr. 8, 2014, 2 pages.

"Halogen eAppraisal", Halogen Software, Inc., Available online at: http://www.halogensoftware.com/products/halogen-eappraisal/features, Apr. 2014, 11 pages.

"Latest Edition of Halogen's Talent Management Suite", Halogen Software, Inc.,, Available online at: http://www.halogensoftware.com /company /news/latest-edition-of-halogens-talent-management-suite-raises-the-bar-on-what-hr-can-expect-from-a-technology-vendor, Apr. 2014, 6 pages.

"Mobile, Drive mission focus from the field with Work.com Mobile", Salesforce Work.com, Available online at: http://work.com/mobile, 2013, Apr. 2014, 6 pages.

"Peoplefluent Social HCM Suite", peoplefluent, Available online at: http://www.worldatwork.org/adim/marketplace/pub/people1.pdf, 8 pages.

"Performance@Work", saba, Available online at: www.saba.com/performance-management, Sep. 2013, 2 pages.

"Plateau Brings Mobility to Talent Management and Simplifies Applications", Available online at: http://marksmith.ventanaresearch.com/2010/11/28/plateau-brings-mobility-to-talent-management-and-simplifies-applications/, Nov. 28, 2010, 2 pages.

"Plateau Systems Delivers Mobile Talent Management with Plateau Anywhere", Learning Technolgies, Available online at: https://www.

(56) References Cited

OTHER PUBLICATIONS trainingindustry.com/learning-technologies/press-releases/plateau-systems-delivers-mobile-talent-management-with-plateau-anywhere.aspx, 2014, 2 pages.

Henschen; Doug, "Salesforce.com and Facebook co-developed new Work.com app for goal-setting, employee feedback, and performance reviews", Salesforce.com Goes to Work.com, Available online at: http://www.informationweek.com/applications/salesforce com-goes-to-workcom/d/d-id/1106408, Retrieved on Apr. 4, 2014, 11 pages.

"SuccessFactors Performance and Goals", gavdi, Available online at: http://www.gavdi.com/en-GB/Group-Newsletter-2013/SuccessFactors-Performance-and-Goals.aspx, 2013, 2 pages.

"SumTotal Enterprise HR Solutions", SumTotal, , Available online at: http://www.sumtotalsystems.com/enterprise/, Retrieved on Apr. 8, 2014, 5 pages.

'SumTotal Systems Sums Up Human Capital Management', Available online at: http://marksmith.ventanaresearch.com/2012/04/09/sumtotal-systems-sums-up-human-capital-management/, Apr. 9, 2012, 3 pages.

"SumTotal's TotalPerformance", SumTotal, Available online at: www.sumtotalsystems.com, 2004, 4 pages.

Stravarius; Justin, "Visualize Your Goals in a Refreshing New Way With Goalscape", Available online at: http://web.appstorm.net/reviews/project-management/visualize-your-goals-in-a-refreshing-new-way-with-goalscape/, Jul. 23, 2011.

"Workday Talent Management", workday, Available online at: http://www.workday.com/Documents/pdf/datasheets/datasheet-workday-talent-management.pdf, 2013, 2 pages.

Patel; Sameer, "Your performance goals need a goal post", diginomica, Available online at: http://diginomica.com/2013/10/01/goals-goal-post-2/, Oct. 1, 2013, 5 pages.

\* cited by examiner

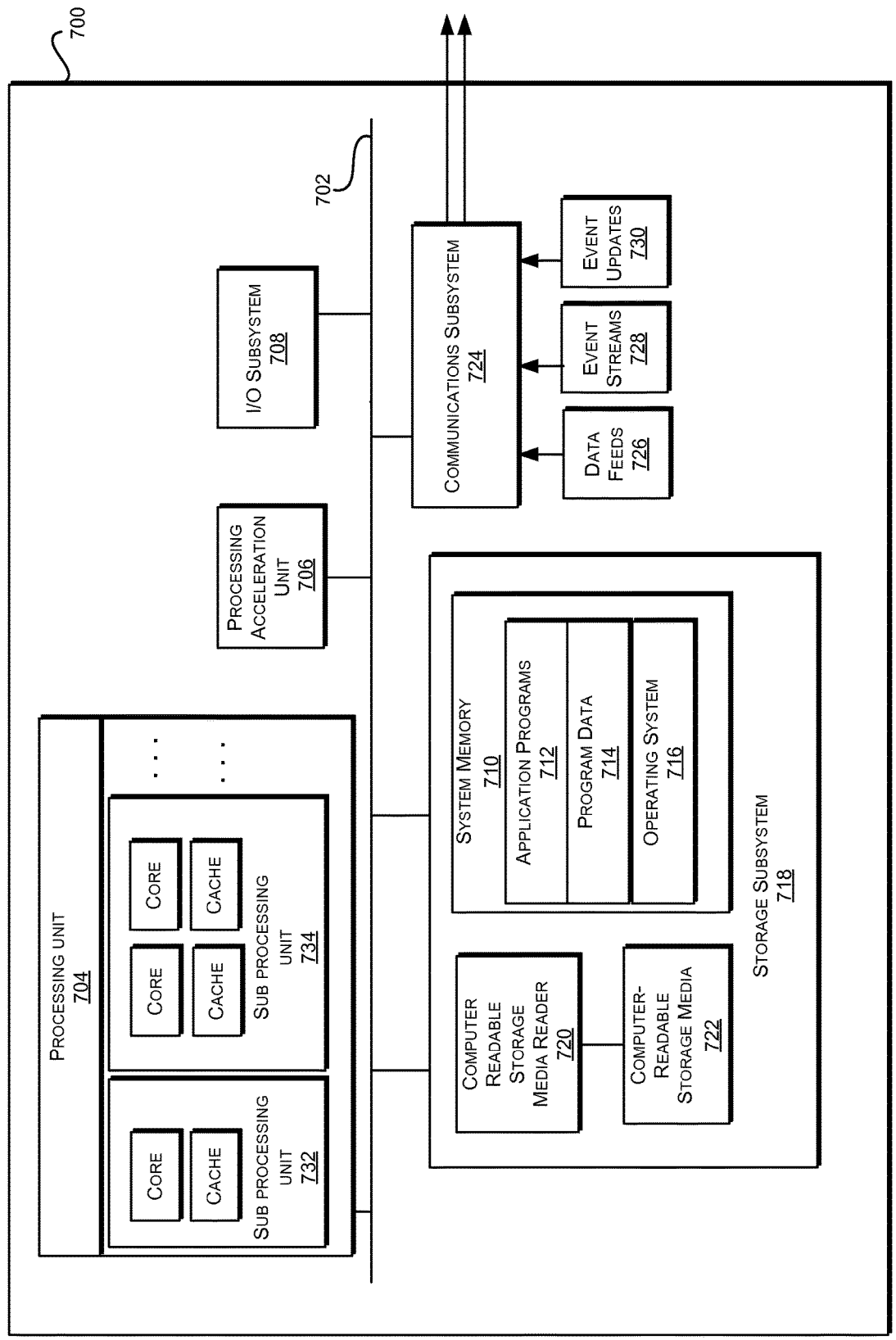

GOAL AND PERFORMANCE MANAGEMENT PERFORMABLE AT UNLIMITED TIMES AND PLACES

CROSS-REFERENCE TO RELATED APPLICATIONS

The present application claims priority under 35 U.S.C. § 119(e) to U.S. Provisional Patent Application Ser. No. 62/050,677, titled "GOAL AND PERFORMANCE MANAGEMENT PERFORMABLE AT UNLIMITED TIMES AND PLACES," and filed on Sep. 15, 2014; the contents of that patent application are incorporated by reference herein for all purposes.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

The present disclosure pertains generally to the field of mobile computing. It is often repeated (and sometimes even to music) that it's a small world, for the world has become an increasingly globalized environment. Instead of being consolidated within a compact geographical region centered around a brick-and-mortar office, an enterprise's employees might be spread all over the Earth. Managers of these employees might manage employees located in various different nations, in various different time zones. Even if these employees work during regular business hours, the moments at which some employees are working might overlap only partially or not at all with the moments at which other employees are working. The moments at which employees' managers work might not significantly overlap with the moments at which the employees themselves work.

Complicating this temporal divergence is the fact that modern enterprises often permit their highly talented employees a great deal of flexibility and choice as to the hours in which they work. Thus, even if a set of employees are geographically located within the same or relatively nearby time zones, the differences in those employees' choices of times of day at which they work can reduce the periods in which any significant fraction of them can be found laboring concurrently.

Additionally, in today's world, it has become increasingly challenging to classify a person's activities as being strictly business or strictly pleasure at any given moment. People have learned to multi-task. A person might be able to perform his or her tasks as an employee while simultaneously engaging in other activites that are not work-related. For example, a person might formulate business strategies, programming techniques, legal constructs, etc., while running on a treadmill or lifting weights at a gym, while dining at a restaurant, or while driving or riding from place to place.

In spite of these complications of modern life, enterprises still seek to improve productivity, and productivity traditionally is improved through accountability. Enterprises require their employees to set goals that will further those enterprises' objectives. Enterprises want to measure employees' progress toward completing these goals. Hopefully, enterprises reward those who achieve their goals. However, due to a variety of factors including some discussed above, the measurement of employee performance might not now be as simple as it was once.

If employees only contemplate their goals and the progress they have made toward their goals immediately prior to a review, the employees are less likely to achieve those goals. Conversely, if employees are constantly minding their goals and the progress that they are making toward those goals, those employees are more likely to work in a manner designed specifically to achieve those goals. Unfortunately, the geographical and temporal dispersion of an enterprise's employees discussed above, and the resulting isolation that employees may often perceive as a result, may be anything but conducive to helping employees to keep their goals in mind.

Too often, as a person engages in many different activities at once, that person can lose sight of the ultimate purposes behind certain ones of those activities. If, due to geographical and temporal distances and blurred activity definitions, employees only rarely review their progress with their managers, those employees might find that they have neglected to place as much emphasis on their progress as they could, should, and would have.

To the extent that computer-executed applications are available to assist an employee in setting goals and measuring the progress toward those goals, those applications typically require an active connection to a server with which those applications communicate. Those applications typically execute on enterprise-owned non-portable desktop computing machines on which those applications have been professionally installed by the enterprise's information technology professionals. These computing machines will typically be permanently located at the enterprise's office, which might only be accessible during limited business hours. These computing machines and the machine on which the server executes will typically be securely interconnected via an intranet that is intentionally isolated from the outside world. Because modern employees often perform work tasks at various times and in various places other than a brick-and-mortar office, employees just as often might find it inopportune to interface with such applications on a regular basis.

Unlike previous eras, in which a worker's assigned tasks might be dominated by physical effort, the highly intellectual nature of many of today's careers enables employees to labor mentally while engaging in other activities. This is not necessarily to say that those other activities are always absolutely divorced from labor, however. Sometimes, for example, the potentially personal activities in which an employee engages online might very well advance his or her progress towards his or her (or the enterprise's) goals. One popular use of the Internet involves social media. Although such social media can be used for personal, familial, friendly, or romantic purposes, such social media also is often used for business purposes as well. The blurring of the lines between business and pleasure extend into online activities too. In an information society, work may be analogized less and less to physical matter, and more and more to pure energy, while the equation of the two has been lauded as genius.

Sometimes, the activities in which a person engages largely for personal purposes can have beneficial effects in the business domain as well. For example, a person enhancing friendships online might (inadvertently or not) also enhance the chances of establishing a valuable business relationship with his or her contacts. It is well known that face-to-face socializing has long been a legitimate way of garnering clients; there is no reason that the same principles should not apply to online socializing as well.

Employees clearly want to be able to demonstrate, to their managers, the efforts that they have put into pursuing their own goals and those of the enterprise. Such demonstration increases the chances that an employee can obtain a favorable review from his manager, hopefully resulting in rewards such as raises, bonuses, awards, promotions, etc. Unfortunately, the contribution that an employee's online activites have made toward the achievement of his or her goals is currently difficult to establish. Detrimentally to the employee, such online activities are typically forgotten and ignored at review time. A resulting miscalculation of an employee's true productivity and corresponding value clearly works to the enterprise's detriment as well.

BRIEF SUMMARY OF THE INVENTION

Embodiments disclosed herein enable employees to manage their goals and track their performance at any time, and from any place. A mobile device such as a tablet computer or a smart phone can download goal information over the Internet from a remote server. If there are several separate goals, then the mobile device can download this information one goal at a time. After the mobile device has downloaded a selected goal, the mobile device can provide user interfaces through which its user can work on the goal. When the user indicates that they have finished working on the goal, the mobile device can upload the result of the work performed on the mobile device to the remote server over the Internet.

In this manner, employees are not restricted to any particular time interval or geographical location when interacting with their goal and performance data. Employees can, for example, interact with their goal and performance data during non-business hours, and at locations other than their official workplace. Employees can interact with their goal and performance data while travelling to or from their workplace, while at the gym, etc. This capability encourages employees to think about and focus on their goals with greater frequency. Thinking about and working toward goals is therefore more likely to become a part of the employee's daily routine.

Thus, at virtually any time, and in virtually any place, employees can plan goals, measure their progress toward achieving those goals, and/or re-align those goals as they choose. Embodiments do not require that all goals be downloaded to the mobile device concurrently, so the memory capacity of the mobile device does not need to be enormous in these embodiments. Furthermore, embodiments do not require that the mobile device maintains a constant connection to the Internet or the remote server while an employee is interacting with his or her goal and performance data; the connection can be made immediately prior to data download and data upload, and terminated immediately following data download and data upload.

Furthermore, embodiments disclosed herein enable an employee to augment his or her goal and performance data using data from third-party systems. Such systems can be online, for example, and can include both social media applications and applications unrelated to social media. The data from the third party systems can be incorporated into the goal and performance data as evidence of the employee progressing toward and/or achieving his or her goals. For example, such data from a third-party system might include tweets from a Twitter feed, or stock prices from a NASDAQ ticker feed.

Additionally, embodiments disclosed herein include a system that automatically generates a set of goals for an employee based on a variety of factors. These factors can include, for example, tags, career interests, competency gaps, popular picks, and next-job-up goals.

BRIEF DESCRIPTION OF THE SEVERAL VIEWS OF THE DRAWINGS

FIG. 7 illustrates an example of a computer system in which various embodiments of the present invention may be implemented.

DETAILED DESCRIPTION OF THE INVENTION

Figure 1:
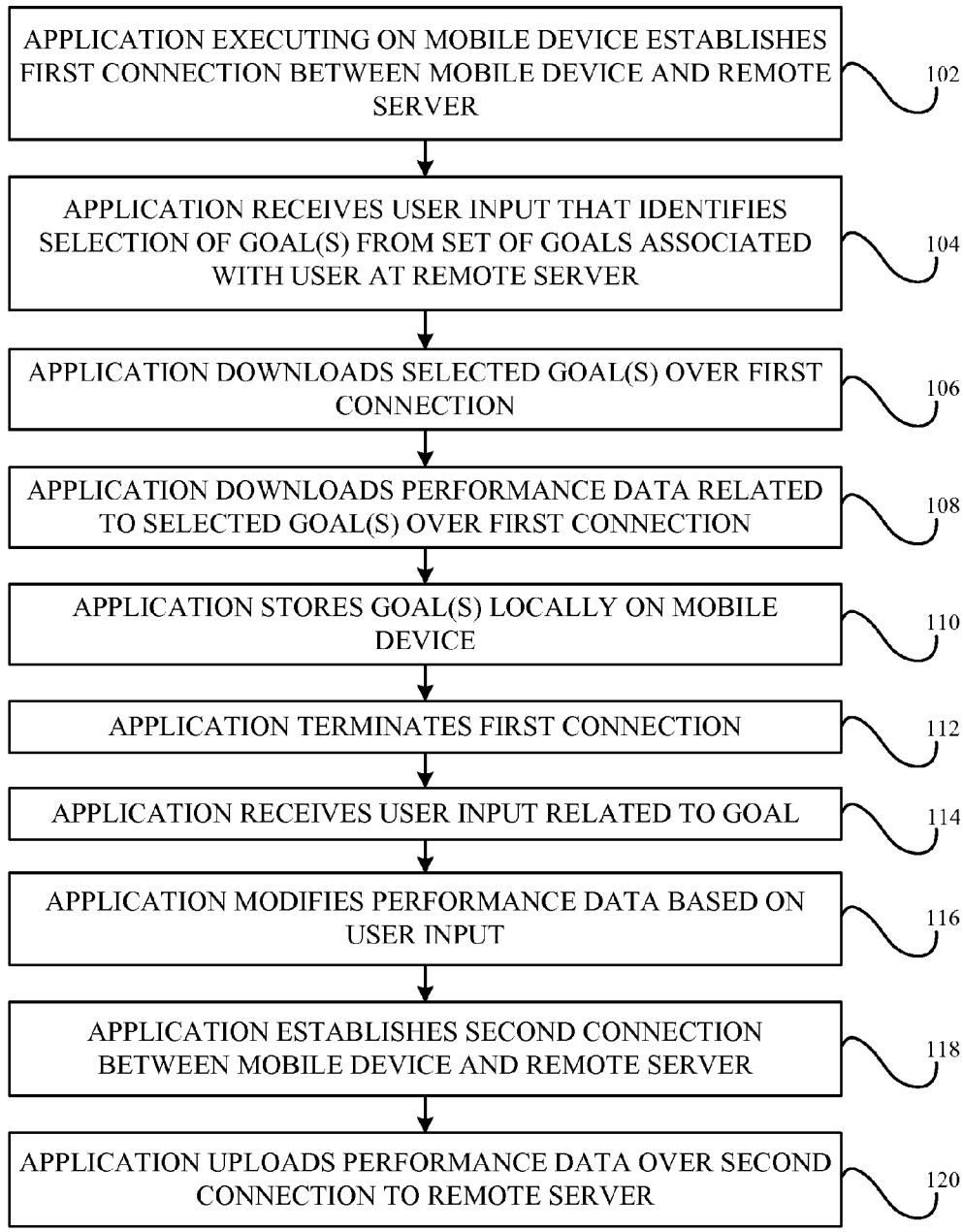
FIG. 1 is a flow diagram that illustrates an example of a technique through which a companion mobile application can obtain selected goals from a remote server so that a user can work on those goals offline and later synchronize the work produce with the remote server, according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Oracle Fusion

Discussed herein are Oracle Fusion Applications (OFA). OFA is a suite of enterprise resource planning software applications from Oracle Corporation. This suite is distributed across various product families, including financial management, human capital management, customer relationship management, supply chain management, procurement, governance, and project portfolio management. Although reference is made herein to OFA, embodiments are equally applicable to enterprise resource planning software applications of all kinds from any vendor. OFA is just one example of such enterprise resource planning software.

Companion Mobile Application

In some embodiments, a mobile application executing on a mobile device can display a user interface that contains a set of interface elements corresponding to a set of objects. For example, such objects can include goal objects. The user interface can accept user input that selects a particular object from the set of objects. In response to this selection, the mobile device can establish a connection over the Internet to a remote server, potentially using a WiFi interface. The mobile device can then download the particular object from the remote server through the connection. After downloading the particular object and storing the particular object in its local memory, the mobile device can terminate the connection to the remote server.

Through the mobile application, the mobile device can present user interfaces that accept user input for modifying the particular object stored locally. In response to such user input, the mobile device can modify the particular object in its memory. The mobile device can modify the particular object even when no network connection is available to the mobile device.

The user interfaces can also include controls which, when activated by a user, cause the mobile device to re-establish a connection over the Internet with the remote server. After re-establishing the connection, the mobile device can upload the modified object from its memory to the remote server. The remote server consequently stores the modified object within its storage devices, thereby synchronizing the version of the object in its storage devices to match the version of the object stored in the mobile device's memory. The mobile device can then once again terminate the connection to the remote server.

Although in some embodiments a mobile application can enable the selection and modification of a particular object, as described above, in some embodiments, the mobile application can additionally or alternatively enable the download of multiple objects to the mobile device, and the subsequent upload of these multiple objects to the remote server.

It is not necessary for the mobile device to use the same network communication service for downloading objects that the mobile device uses for uploading objects, or vice-versa. For example, the mobile device might use a WiFi connection through one WiFi access point to perform the download, and then use a WiFi connection through a different WiFi access point to perform the upload. For another example, the mobile device might use a 3G or 4G cellular telephone data connection to perform either the upload or download, and use a WiFi connection to perform the complementary transmission.

In some embodiments, the mobile device can store and execute a mobile application that performs the downloading, modification, and uploading discussed above. Additionally, this mobile application can include at least some of the functionality that is found in full-fledged versions of OFA and other enterprise resource planning software. The subset of functionality included within the mobile application can include functionality that is most often used by users who are not currently at their workplace.

In some embodiments, the mobile application can be programmed as a native application, in the same programming language as the operating system of the mobile device on which the mobile application executes. The mobile application can be designed to call routines that are exposed by an application programming interface (API) of the operating system. Such routines can receive input from and sent output to various subsystems of the mobile device, such as a touch screen display, speakers, a vibration-producing engine, a headphone jack, a WiFi interface, a Bluetooth interface, a global positioning system (GPS), an accelerometer, a telephony engine, a front-facing camera, a rear-facing camera, a flash bulb, a silence switch and/or other switches, volume control buttons and/or other buttons, etc. In this way, the mobile application can offer methods of interaction with a user that might not be feasible on other types of computing devices, and can take advantage of methods of interaction that are uniquely offered by that type of mobile device.

Furthermore, in some embodiments, the mobile application can be designed to call routines that are exposed by the API of the operating system in order to obtain information regarding a screen size, screen dimensions, and screen resolution of the mobile device on which the mobile application executes. In response to receiving such information, the mobile application can customize its user interfaces to best make use of and to maximally fit within the display of the mobile device on which it executes.

In some embodiments, the mobile application can be configured to receive notifications automatically pushed to the mobile device from the remote server. In such embodiments, at times that the mobile device detects an Internet connection, the mobile device can automatically, without user intervention, establish a connection to the remote server and download any notifications that have accumulated for the mobile device's user at the remote server. These notifications can relate to goals or performance data for the user, for example. The remote server can push these notifications to the mobile device as the notifications become available at the remote server. As the mobile device receives the notifications, the mobile device can use a notification center of its native operating system in order to route the notifications to the mobile application. The mobile application, in turn, can present real-time alerts to the user in response to these notifications.

FIG. 1 is a flow diagram that illustrates an example of a technique through which a companion mobile application can obtain selected goals from a remote server so that a user can work on those goals offline and later synchronize the work produce with the remote server, according to some embodiments. Although FIG. 1 illustrates operations being performed in a specific order, alternative embodiments can involve additional, fewer, or different operations being performed in a similar or a different order.

In block 102, an application executing on a mobile device establishes a first connection between the mobile device and a remote server. In block 104, the application receives user input that identifies a selection of one or more goals from a set of goals associated with a user at the remote server. In block 106, the application downloads, over the first connection, from the remote server to the mobile device, the one or more goals selected in block 104. In block 108, the application downloads, over the first connection, from the remote server to the mobile device, performance data related to the one or more goals downloaded. In block 110, the application stores the one or more downloaded goals and the related performance data locally on the mobile device. In block 112, the application terminates the first connection between the mobile device and the remote server.

In block 114, the application receives user input related to a goal. In block 116, the application modifies the performance data stored on the mobile device based on the user input.

In block 118, the application establishes a second connection between the mobile device and the remote server. In block 120, the mobile device uploads the performance data over the second connection to the remote server. The mobile device also can upload modified goals over the second connection to the remote server. In this manner, the goal and performance data stored at the remote server becomes synchronized with the goal and performance data modified at the mobile device.

Embedded External Feeds

In some embodiments, the mobile application can displays user interfaces that accept user input that selects one or more external feeds (e.g., Twitter, Facebook, LinkedIn, Embedded Analytics, NASDAQ, etc.) from a set of external feeds. Additionally or alternatively, such user interfaces can include text-entry fields through which a user can enter a source (e.g., a uniform resource locator (URL)) of an external field of the user's choice. The user interfaces can accept parameters that pertain to the external feeds, such as stock ticker symbol, a hash tag, etc. As is discussed below, the values of such parameters can be used as filters to select a subset of data from an external feed automatically.

The user interfaces can accept user input that enables the configuration of the external feeds. The user interfaces also can accept user input that specifies a set of documents, such as goal and performance documents, into which data from the specified external feeds should be embedded. Such documents can be stored at the remote server, for example. A single feed can be embedded into multiple separate documents, and multiple separate feeds can be embedded into a single document.

In response to user input that specifies an external feed and a document into which that feed is to be embedded, the mobile application can, the next time that is connected to the remote server, send to the remote server data that causes the remote server to establish a mapping between the specified document and the specified feed. Thereafter, the remote server can automatically, continuously, and asynchronously read data from the specified feed and insert that data into the document as the data become available. As a result, the documents can constantly reflect the most recent data from the specified feed.

The remote server can store configuration information associated with each external feed. For example, the configuration information can include one or more user-specified filters that select, from an external feed, only data that satisfy user-specified criteria. For another example, the configuration information can indicate an amount of time for which data from an external feed is to be preserved; the remote server can automatically remove data older than the specified amount of time from a document into which the external feed is embedded. For another example, the configuration information can indicate an area of a document on which data from the external feed are to be included.

Data embedded into a goal and performance document from one or more external feeds can help employees and users of the mobile application to track their progress in achieving their goals. Such embedding can help employees and users of the mobile application to follow their career plans. Such embedding can support an employee's self-evaluation in performance documents, as evidence of the facts asserted by the employee within those documents.

In some embodiments, multiple users are authorized to embed and/or to configure feeds within a particular user's documents. For example, the remote server can store permission information that indicates that a particular employee's manager is authorized to embed feeds specified by the manager into the particular employee's goal and performance documents. Additionally or alternatively, the remote server can store permission information that indicates that a particular employee's manager is authorized to configure feeds already embedded in the particular employee's goal and performance documents, either by the employee or someone else.

In some embodiments, each document into which an external feed is embedded can include a hyperlink that points to the source of that external feed. In response to the selection (e.g., clicking upon) such a hyperlink, an application displaying the document (e.g., an Internet web browsing application) can retrieve, over the Internet, from the source (e.g., a web page), data from which the external feed was extracted. The application can then display this source data (e.g., web page) as a more comprehensive view and as a verification of the related data embedded within the document. Thus, the remote server can automatically generate the document itself (or at least portions thereof) to include a mechanism for navigating from the document to sources of external feeds embedded within the document.

Due to the data from one or more external feeds being embedded into an employee's goal and performance document, evaluators of the employee are able to assess that employee's performance at virtually any time, rather than just at specific times at which the employee has been asked to update the document. The document remains relatively current even if the employee does not manually update the document at a high frequency. Furthermore, data from the external feeds can include comments and ratings from systems and entities external to the enterprise. Such comments and ratings, which without the embedding disclosed herein likely would not be considered at all, can constitute an additional valuable source of information to be used when evaluating the employee's performance. Such comments and ratings can highlight achievements that might otherwise might have gone undocumented.

Figure 2:
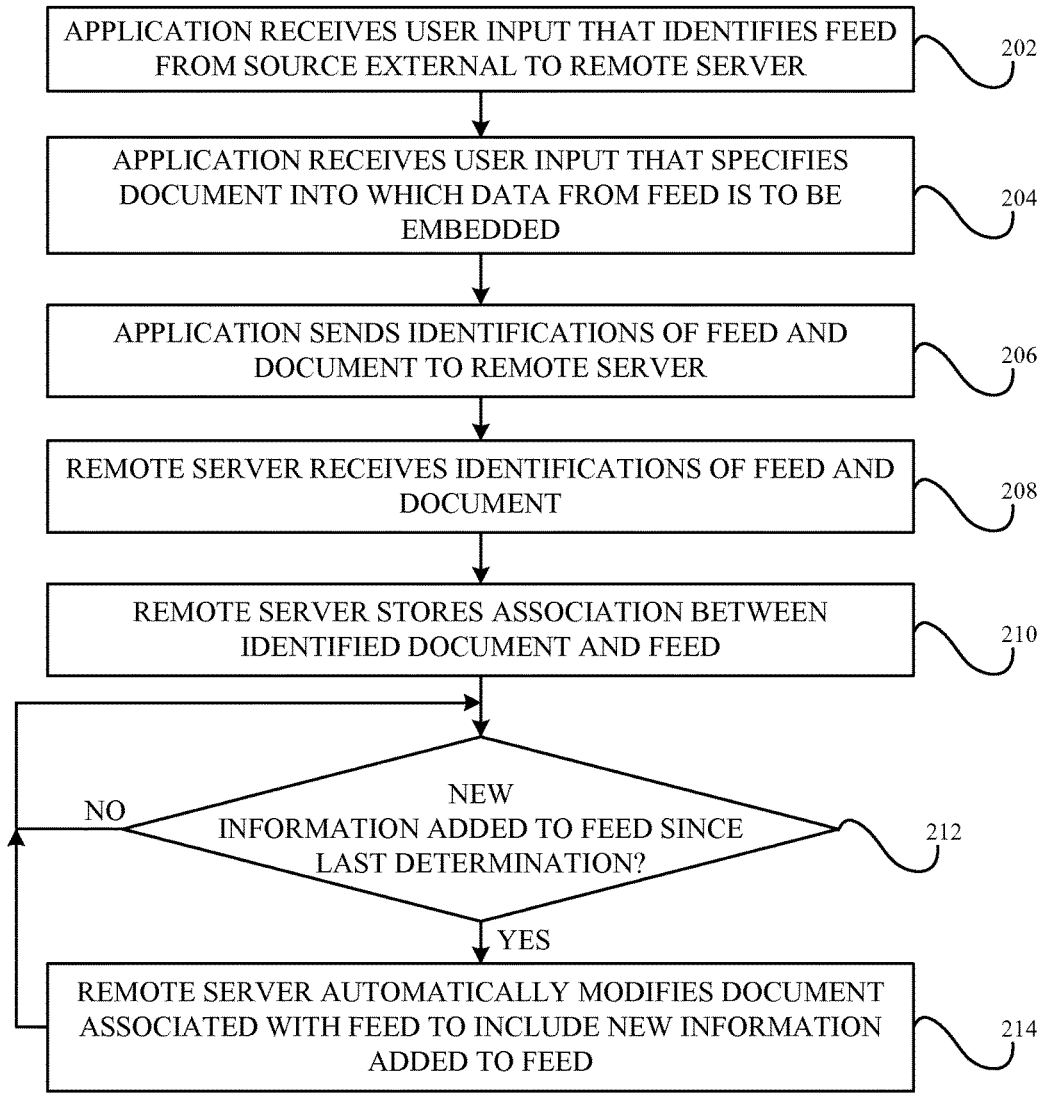
FIG. 2 is a flow diagram that illustrates an example of a technique through which a server that stores a goal and performance document can automatically update that document based on a feed that originates from a source external to that server, according to some embodiments.

FIG. 2 is a flow diagram that illustrates an example of a technique through which a server that stores a goal and performance document can automatically update that document based on a feed that originates from a source external to that server, according to some embodiments. Although FIG. 2 illustrates operations being performed in a specific order, alternative embodiments can involve additional, fewer, or different operations being performed in a similar or a different order.

In block 202, an application receives user input that identifies a feed from a source external to a remote server. In block 204, the application receives user input that specifies a document into which data from the feed is to be embedded. In block 206, the application sends an identification of the feed and an identification of the document to a remote server.

In block 208, the remote server receives the identification of the feed and the identification of the document. In block 210, the remote server stores an association between the document and the feed.

In block 212, the remote server determines whether any new information has been added to the feed since a last time that the remote server made this determination. If so, then the remote server updates the document in block 214. Otherwise, the remote server continues to monitor the feed back in block 212.

In block 214, the remote server automatically modifies the document associated with the feed to include the new information added to the feed. The remote server then continues to monitor the feed back in block 212.

Configurable Dashboard

In some embodiments, the user interfaces presented by the mobile application can be at least partially user-defined. For example, the mobile application can present a configuration user interface that includes various categories of user interface elements. From the configuration user interface, the user can select, from each category, specific user interface elements that appeal to the user.

The categories of user interface elements can correspond to different parts of a user interface or to items that will be presented with a user interface. For example, categories might include a backdrop, an object, an object alert, etc. The configuration user interface might allow a user to select, as a backdrop, an ocean (e.g. boat) race, a track (e.g., car) race, a sky (e.g., balloon race), etc. The configuration user interface might allow a user to select, as an object, a car, a boat, a hot-air balloon, etc. The configuration user interface might allow a user to select, as an object alert, a target completion date, a review date, etc. In response, the mobile device can cause a notification center of its operating system to produce an alert in response to the occurrence of a user-specified event.

The configuration user interface can allow a user to specify values of attributes of selected user interface elements as well. For example, the configuration user interface can provide a selection of colors to be associated with various properties that an object can possess. For example, a first color can be associated with objects belonging to a financial object category, a second color can be associated with objects belonging to a a customer category, etc. For another example, a first color can be associated with a first progress status, a second color can be associated with a second progress status, and a third color can be associated with a third progress status, in a manner similar to which red, amber, and green are assigned to different statuses that a traffic light can possess. The color or shade of a region of a user interface can be based dynamically on a current value of an object's attribute. For example, a user interface might include a region representative of the sky, and the color and/or shade and/or complexion of the sky (sunny, stormy, etc.) may vary with an overall status of an employee's progress towards his or her goals.

The configuration user interface can allow a user to specify attributes that indicate coordinates (e.g., in pixels) at which various user interface elements are to be presented within a specified user interface. These specified attributes can include sizes (e.g., in pixels) for the user interface elements as well. In one embodiment, the configuration user interface accepts user input that associates different positions on the display with different values that a specified attribute of an object can assume. When the mobile application has obtained such input, the mobile application can subsequently automatically move a user interface element corresponding to the object to a location corresponding to the current value of the object's attribute. Thus, for example, as an target completion date approaches, the mobile application can move a representative user interface element further across a user interface.

Figure 3:
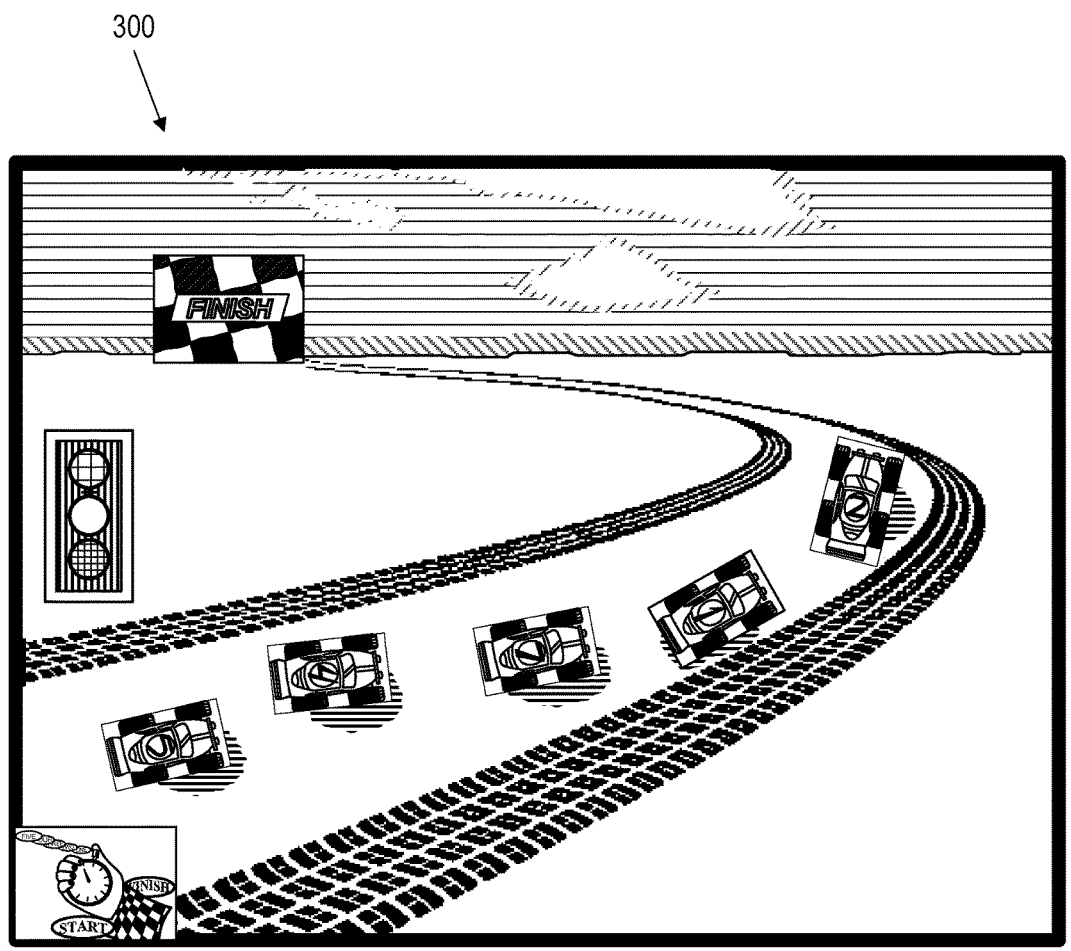
FIG. 3 is a diagram that illustrates an example of a dashboard that has been customized using a configuration user interface, according to some embodiments.

FIG. 3 is a diagram that illustrates an example of a dashboard 300 that has been customized using a configuration user interface, according to some embodiments.

Multiple different user interfaces can be customized through the configuration user interface. For example, a first user interface might correspond to the goals and progress of an individual employee, while a second user interface might correspond to the goals and progress of a team to which the employee belongs.

In some embodiments, the mobile application stores snapshots of its user interfaces periodically or in response to a change in a user interface. Alternatively, the mobile application can upload such snapshots for storage at the remote server. The mobile application can provide a mechanism through which a user can view a list of historical snapshots of a specified user interface with their corresponding dates and times. The mechanism can accept user input that selects a particular snapshot. Upon receiving such user input, the mechanism can display the selected snapshot on the mobile device's display. In this manner, a user can view a change over time in his progress toward a goal.

Goal Guru

An employee in an organization can find it difficult to formulate realistic personal goals from scratch. Disclosed herein are techniques for assisting an employee or other user to generate personal goals in a semi-automated manner.

In some embodiments, the remote server includes a case-based reasoning system. The case-based reasoning system can use artificial intelligence techniques to assist an employee in formulating his goals, so that the employee does not need to generate his goals from scratch. A goal guru executing on either the remote server, the mobile device, or distributed between both can provide mechanisms through which an employee can align his own goals with those of the enterprise.

In some embodiments, the remote server first represents by building a case base of successful past goal sets and best practices (cases), indexed by key attributes. These key attributes can be represented within database columns and can include attributes such as position, goal name, success criteria, target outcomes (e.g., an extent of proficiency that the employee desires to obtain), goal tasks or actions needed to achieve the goal, etc. Next, the remote server can retrieve by using similarity metrics to extract a set of goals from a goal library. Next, the remote server can adapt the cases. Next, the remote server can apply by assigning goal sets to a particular employee.

In some embodiments, the remote server can communicate with a goal guru application executing on the mobile device. The goal guru can intelligently suggest goals according to tags, career interests, competency gaps, popular picks, and next-job-up goals. The goal guru also can provide alerts as to jobs or training that may be of interest to an employee.

The remote server can maintain a database of many different employees' goals. The database can also include best practices. Together, this information makes up the case base. The case base can be indexed by key attributes.

The remote server can use similarity metrics to extract a set of goals from the database (e.g., a goal library). The remote server can adapt these goals for assignment to a particular employee. For example, the remote server can select, from its database, a set of employees having attributes similar to a particular employee for whom goals are to be generated. These attributes may include, for example, job title, education level, salary, years of experience, security clearance, geographical region, etc.

In some embodiments, the remote server has access to a next employment role, or "next job up," for which the employee could be eligible in the event of the employee's promotion. The remote server can select, from its database, a set of employees who currently occupy that next employment roles. These employees might have goals that make a good model for the kinds of goals that the particular employee should strive to achieve in order to be eligible for promotion to that next employment role.

In some embodiments, the remote server stores data indicating a set of skills that are required for the particular employee's "next job up." For each of these skills, the remote server can store data indicating a skill level that is required for that "next job up." The remote server also can store information that indicates the the particular employee's current skill level for each of these skills. Based on the gap between the particular employee's current skill level for each of these skills and the skill level required by the "next job up" for each of these skills (i.e., the competency gap), the remote server can automatically generate goals designed to increase the particular employee's skill level for each of those skills to the skill level required. For example, the remote server could generate a goal related to taking and passing an educational course in a programming language.

For each of the selected employees, the remote server can select, from its database, goals that each of the selected employees previously set. From these goals, the remote server can select goals that those employees actually achieved or came near (e.g., within a specified threshold percentage) to achieving. These are the goals that are most likely to represent goals that the particular employee realistically could also achieve. The remote server can also select, from its database, goals that the particular employee himself set for previous review periods. The remote server also can select, from its database, goals that have been set for an organizational group (e.g., department, enterprise, etc.) to which the particular employee belongs.

In some embodiments, the remote server can select, from its database, goals that are "popular picks." For each goal in its database, the remote server can keep track of a quantity of employees that previously set (and/or achieved) that goal. The remote server can select goals based on such quantities. For example, the remote server can select goals that at least 75% of employees generally, or employees in the particular employee's department, or employees at the particular employee's level, or employees having attributes similar to the particular employee, also set for themselves.

In some embodiments, the remote server can select, from its database, goals that are tagged with keywords with which the particular employee is also tagged. For example, if the remote server is configured to select 10 goals for the particular employee, then the remote server can rank the goals in its database based on the quantity of keywords tagged to those goals that are also tagged to the particular employee. The remote server can then select the 10 goals that are most highly ranked in this manner.

The remote server can automatically adapt the goals from the selected set to the particular employee. For example, the remote server can determine ratios of the values of the employee's attributes to the values of the corresponding attributes of the other employees who set that goals within the selected set. The remote server can then multiply the numerical aspects of the goals from the selected set by these ratios in order to produce goals that are customized based on the particular employee's specific attribute values, considering the difference between the particular employee and the other employees. For example, if a particular goal was set by another employee who had X years of experience, while the particular employee has Y years of experience, then the other employee's goal can be multiplied by the ratio Y/X in order to produce a customized goal for the particular employee.

Figure 4:
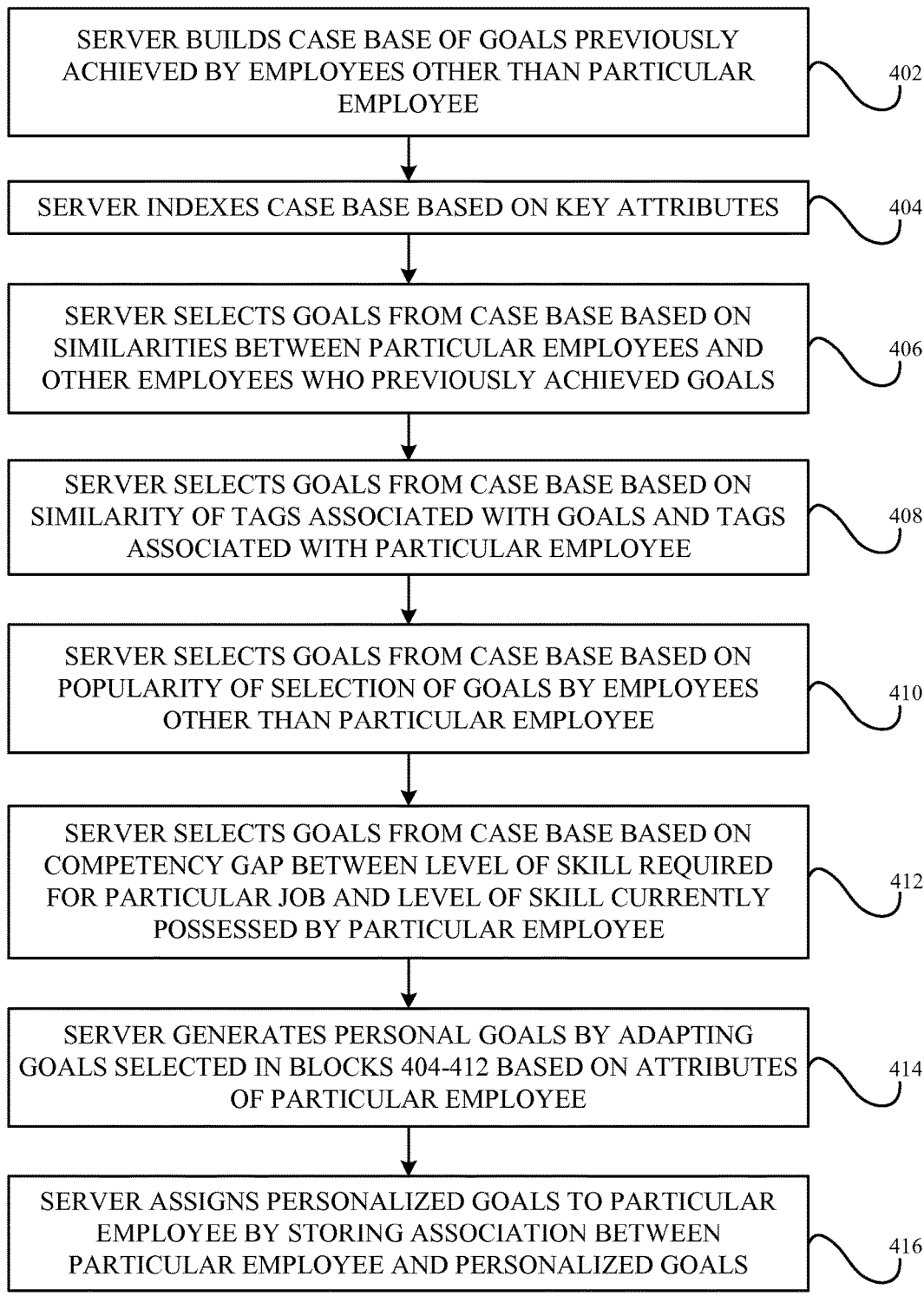
FIG. 4 is a flow diagram that illustrates an example of a technique through which a server can use case-based reasoning in order to select goals that are likely to be appropriate for a particular employee, according to some embodiments.

FIG. 4 is a flow diagram that illustrates an example of a technique through which a server can use case-based reasoning in order to select goals that are likely to be appropriate for a particular employee, according to some embodiments. Although FIG. 4 illustrates operations being performed in a specific order, alternative embodiments can involve additional, fewer, or different operations being performed in a similar or a different order.

In block 402, the server builds a case base of goals that were previously achieved by employees other than a particular employee. In block 404, the server indexes the case base of goals based on key attributes.

In block 406, the server selects one or more goals from the case base of goals based on similarities between the particular employee and the employees who previously achieved the one or more goals.

In block 408, the server selects one or more goals from the case base of goals based on a similarity of tags that associated with the one or more goals and tags that are associated with the particular employee.

In block 410, the server selects one or more goals from the case base of goals based on a popularity of the selection of the one or more goals by people other than the particular employee.

In block 412, the server selects one or more goals from the case base of goals based on a competency gap between a level of skill required for a particular job to which the employee would next be promoted and a level of skill currently possessed by the particular employee.

In block 414, the server adapts the goals selected in blocks 404-412 based on attributes of the particular employee to generate one or more personalized goals for the particular employee.

In block 416, the server assigns the one or more personalized goals to the particular employee by storing an association between the particular employee and the personalized goals.

In some embodiments, although a goal guru application suggests personalized goals automatically formulated using techniques discussed above, the goal guru application accepts user input that selects one or more goals from a set of those personalized goals. The remote server assigns the selected goals to the user by establishing an association between the user and the selected goals.

In some embodiments, after a set of goals has been assigned to a user in the manner described above, one or more other users in the enterprise can modify, enhance, or add to the set of goals assigned to the user. For example, the goal guru application can accept input from managers of the user in order to modify or enhance the goal set assigned to the user.

Hardware Overview

Figure 5:
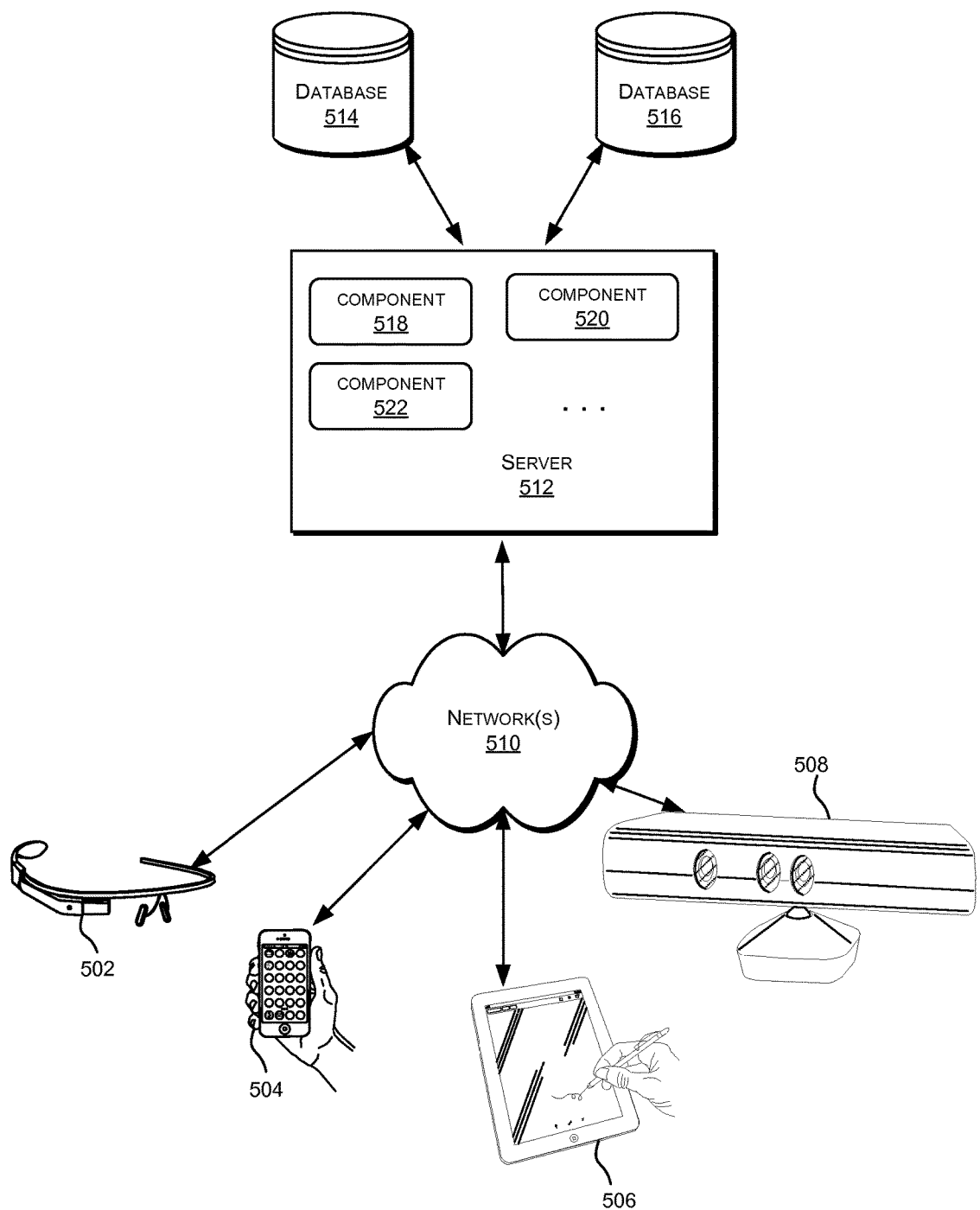
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 502.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, which are adapted to store, update, and retrieve data in response to SQL-formatted commands.

Figure 6:
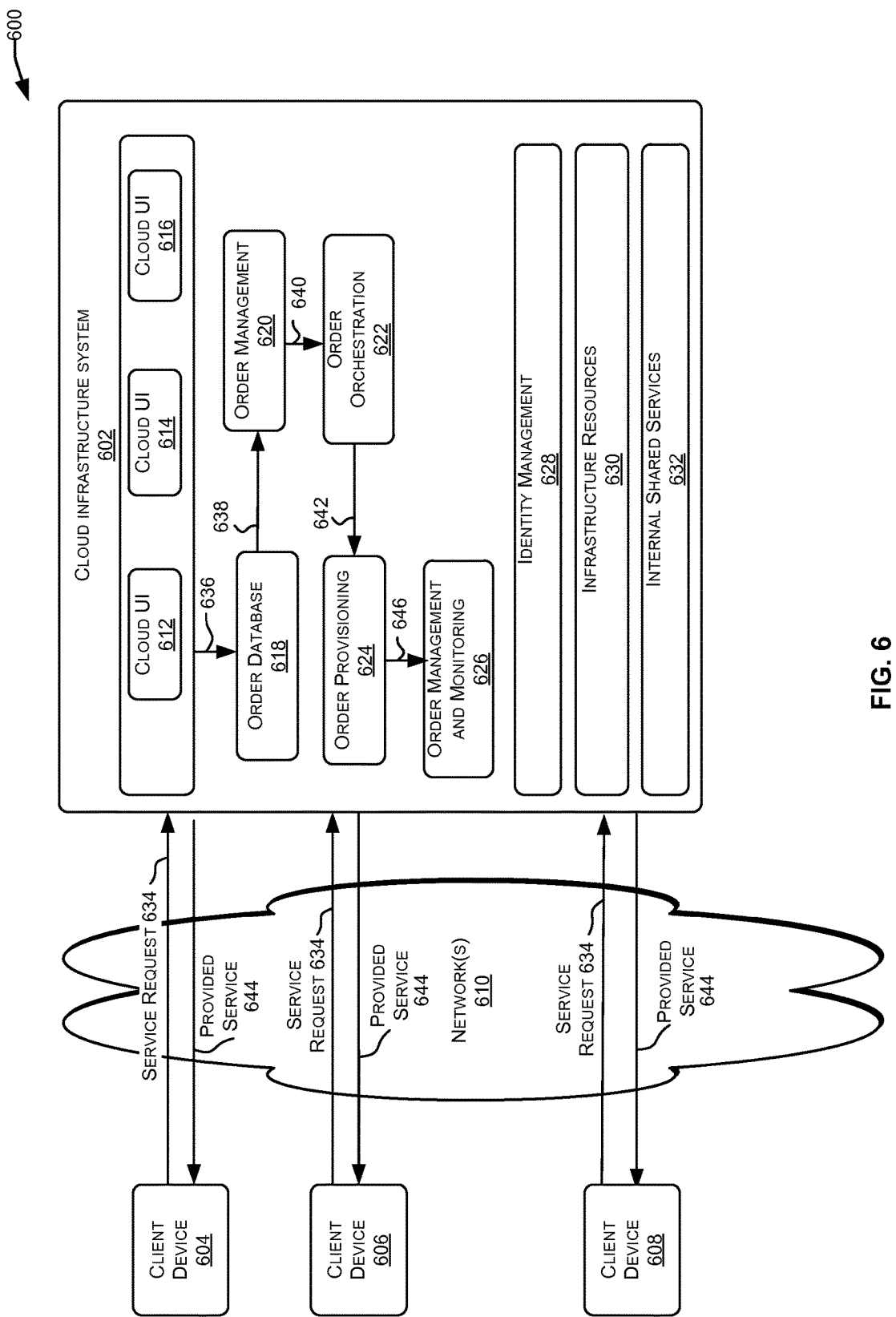
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 802, 804, 806, and 808.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 810.

Cloud infrastructure system 602 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

FIG. 7 illustrates an example computer system 700 in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    establishing, at a mobile device, a first connection to a remote server;
    downloading, by the mobile device, over the first connection from the remote server to the mobile device, one or more goals documents corresponding to goals associated with a user of the mobile device;
    downloading, by the mobile device, over the first connection from the remote server to the mobile device, one or more performance documents related to the goals associated with the user of the mobile device;
    storing, by the mobile device, the one or more downloaded goals documents within a memory device on the mobile device;
    storing, by the mobile device, the one or more downloaded performance documents within the memory device on the mobile device;
    terminating, by the mobile device, the first connection between the mobile device and the remote server, after downloading the goals documents and performance documents;
    after the termination of the first connection, receiving user input at the mobile device, via a performance mobile application relating to the one or more goals associated with the user, the received user input comprising at least one network resource identifier corresponding to a data feed, and one or more filter parameters associated with the data feed;
    modifying, by the mobile device, the one or more performance documents stored in the memory device of the mobile device based on the user input received via the performance mobile application, wherein said modifying comprises embedding the at least one network resource identifier corresponding to the data feed and the filter parameters within the one or more performance documents related to the goals associated with the user of the mobile device, wherein said embedding is performed at a time when no network connection is available to connect the mobile device to the remote server; and
    subsequent to embedding the at least one network resource identifier corresponding to the data feed and the filter parameters within the one or more performance documents:
        (a) detecting that a network connection between the mobile device and the remote server has become available;
        (b) establishing, by the mobile device, a second connection between the mobile device and the remote server;
        (c) uploading, by the mobile device, the one or more modified performance documents over the second connection from the mobile device to the remote server;
        (d) downloading, by the mobile device, one or more notifications relating to the goals associated with the user of the mobile device, from the remote server; and
        (e) terminating, by the mobile device, the second connection between the mobile device and the remote server, after uploading the one or more modified performance documents and downloading the one or more notifications,
    wherein each of (b)-(e) are performed by the mobile device automatically and without user intervention, in response to the detection that a network connection between the mobile device and the remote server has become available.

2. The method of claim 1, further comprising:
    executing, on the mobile device, the performance mobile application, wherein the performance mobile application is an application that is coded in a native programming language in which an operating system of the mobile device is also coded;
    wherein the modifying of the one or more performance documents is performed by the performance mobile application.

3. The method of claim 1, further comprising:
    building a case base of goals that were previously achieved by people other than the user;
    indexing the case base of goals based on key attributes;
    selecting one or more particular goals from the case base of goals based on similarities between the user and the people who previously achieved the one or more particular goals;
    adapting the one or more particular goals, based on attributes of the user, to generate one or more personalized goals for the user; and
    assigning the one or more personalized goals to the user.

4. The method of claim 3, further comprising:
    selecting the one or more particular goals based on a similarity of tags that associated with the one or more particular goals and tags that are associated with the user.

5. The method of claim 3, further comprising:
    selecting the one or more particular goals based on a popularity of selection of the particular goals by people other than the user.

6. The method of claim 3, further comprising:
    selecting the one or more particular goals based on a competency gap between a level of skill required for a particular job and a level of skill currently possessed by the user.

7. The method of claim 1, further comprising:
monitoring, by the remote server, the data feed continuously, after receiving from the mobile device the one or more modified performance documents including the embedded at least one network resource identifier and the filter parameters, to detect new data within the data feed; and
in response to detecting new data within the feed, automatically modifying, by the remote server, the one or more performance documents to include the new data.

8. The method of claim 7, wherein the network resource identifier corresponding to the data feed identifies a data feed from a social media site.

9. The method of claim 7, wherein the network resource identifier corresponding to the data feed identifies a stock ticker feed.

10. The method of claim 1, further comprising:
receiving, at the mobile device, user input that selects one or more particular goals from a set of goals associated with the user at the remote server;
wherein downloading the one or more documents corresponding to goals for the user consists of downloading only the documents corresponding to particular goals without downloading documents corresponding to other goals associated with the user at the remote server; and
wherein downloading the performance documents related to the one or more goals consists of downloading only the performance documents related to the particular goals without downloading other performance documents associated with other goals associated with the user at the remote server.

11. A non-transitory computer-readable storage medium, storing instructions that, when executed by one or more processors, cause the one or more processors to perform operations comprising:
establishing, at a mobile device, a first connection to a remote server;
downloading, by the mobile device, over the first connection from the remote server to the mobile device, one or more goals documents corresponding to goals associated with a user of the mobile device;
downloading, by the mobile device, over the first connection from the remote server to the mobile device, one or more performance documents related to the goals associated with the user of the mobile device;
storing, by the mobile device, the one or more downloaded goals documents within a memory device on the mobile device;
storing, by the mobile device, the one or more downloaded performance documents within the memory device on the mobile device;
terminating, by the mobile device, the first connection between the mobile device and the remote server, after downloading the goals documents and performance documents;
after the termination of the first connection, receiving user input at the mobile device, via a performance mobile application relating to the one or more goals associated with the user, the received user input comprising at least one network resource identifier corresponding to a data feed, and one or more filter parameters associated with the data feed;
modifying, by the mobile device, the one or more performance documents stored in the memory device of the mobile device based on the user input received via the performance mobile application, wherein said modifying comprises embedding the at least one network resource identifier corresponding to the data feed and the filter parameters within the one or more performance documents related to the goals associated with the user of the mobile device, wherein said embedding is performed at a time when no network connection is available to connect the mobile device to the remote server; and
subsequent to embedding the at least one network resource identifier corresponding to the data feed and the filter parameters within the one or more performance documents:
(a) detecting that a network connection between the mobile device and the remote server has become available;
(b) establishing, by the mobile device, a second connection between the mobile device and the remote server;
(c) uploading, by the mobile device, the one or more modified performance documents over the second connection from the mobile device to the remote server;
(d) downloading, by the mobile device, one or more notifications relating to the goals associated with the user of the mobile device, from the remote server; and
(e) terminating, by the mobile device, the second connection between the mobile device and the remote server, after uploading the one or more modified performance documents and downloading the one or more notifications,
wherein each of (b)-(e) are performed by the mobile device automatically and without user intervention, in response to the detection that a network connection between the mobile device and the remote server has become available.

12. The non-transitory computer-readable storage medium of claim 11, wherein the operations further comprise:
executing, on the mobile device, the performance mobile application, wherein the performance mobile application is an application that is coded in a native programming language in which an operating system of the mobile device is also coded;
wherein the modifying of the one or more performance documents is performed by the performance mobile application.

13. The non-transitory computer-readable storage medium of claim 11, wherein the operations further comprise:
building a case base of goals that were previously achieved by people other than the user;
indexing the case base of goals based on key attributes;
selecting one or more particular goals from the case base of goals based on similarities between the user and the people who previously achieved the one or more particular goals;
adapting the one or more particular goals, based on attributes of the user, to generate one or more personalized goals for the user; and
assigning the one or more personalized goals to the user.

14. The non-transitory computer-readable storage medium of claim 13, wherein the operations further comprise:

selecting the one or more particular goals based on a similarity of tags that associated with the one or more particular goals and tags that are associated with the user.

15. The non-transitory computer-readable storage medium of claim 13, wherein the operations further comprise:
selecting the one or more particular goals based on a popularity of selection of the particular goals by people other than the user.

16. The non-transitory computer-readable storage medium of claim 11, wherein the operations further comprise:
monitoring, by the remote server, the data feed continuously, after receiving from the mobile device the one or more modified performance documents including the embedded at least one network resource identifier and the filter parameters, to detect new data within the data feed; and
in response to detecting new data within the feed, automatically modifying, by the remote server, the one or more performance documents to include the new data.

17. The non-transitory computer-readable storage medium of claim 11, wherein the operations further comprise:
receiving, at the mobile device, user input that selects one or more particular goals from a set of goals associated with the user at the remote server;
wherein downloading the one or more documents corresponding to goals for the user consists of downloading only the documents corresponding to particular goals without downloading documents corresponding to other goals associated with the user at the remote server; and
wherein downloading the one or more performance documents related to the one or more goals consists of downloading only the performance documents related to the particular goals without downloading other performance documents associated with other goals associated with the user at the remote server.

18. The method of claim 1, wherein the documents corresponding to goals associated with the user of the mobile device and the performance documents are downloaded by the mobile device over a first WiFi network connection, and wherein the modified performance documents are uploaded over a second cellular network connection.

19. The method of claim 1, further comprising:
prior to receiving the user input at the mobile device via the performance mobile application, retrieving one or more user interfaces of the performance mobile application and behavior logic of the performance mobile application, from the remote server.

* * * * *

UNITED STATES PATENT AND TRADEMARK OFFICE
CERTIFICATE OF CORRECTION

PATENT NO. : 10,169,732 B2  
APPLICATION NO. : 14/535261  
DATED : January 1, 2019  
INVENTOR(S) : Grewal et al.

Page 1 of 1

It is certified that error appears in the above-identified patent and that said Letters Patent is hereby corrected as shown below:

On the Title Page

On page 2, Column 2, under Other Publications, Line 9, after "architectures."" insert --   --.

On page 2, Column 2, under Other Publications, Line 15, after "commitment."" insert --   --.

On page 2, Column 2, under Other Publications, Line 18, after "organizations."" insert --   --.

In the Specification

In Column 2, Line 25, delete "disperson" and insert -- dispersion --, therefor.

In Column 9, Line 41, delete "a a" and insert -- a --, therefor.

In Column 11, Line 17, delete "the the" and insert -- the --, therefor.

Signed and Sealed this  
Seventh Day of January, 2020

Andrei Iancu  
*Director of the United States Patent and Trademark Office*